Patented Jan. 24, 1950

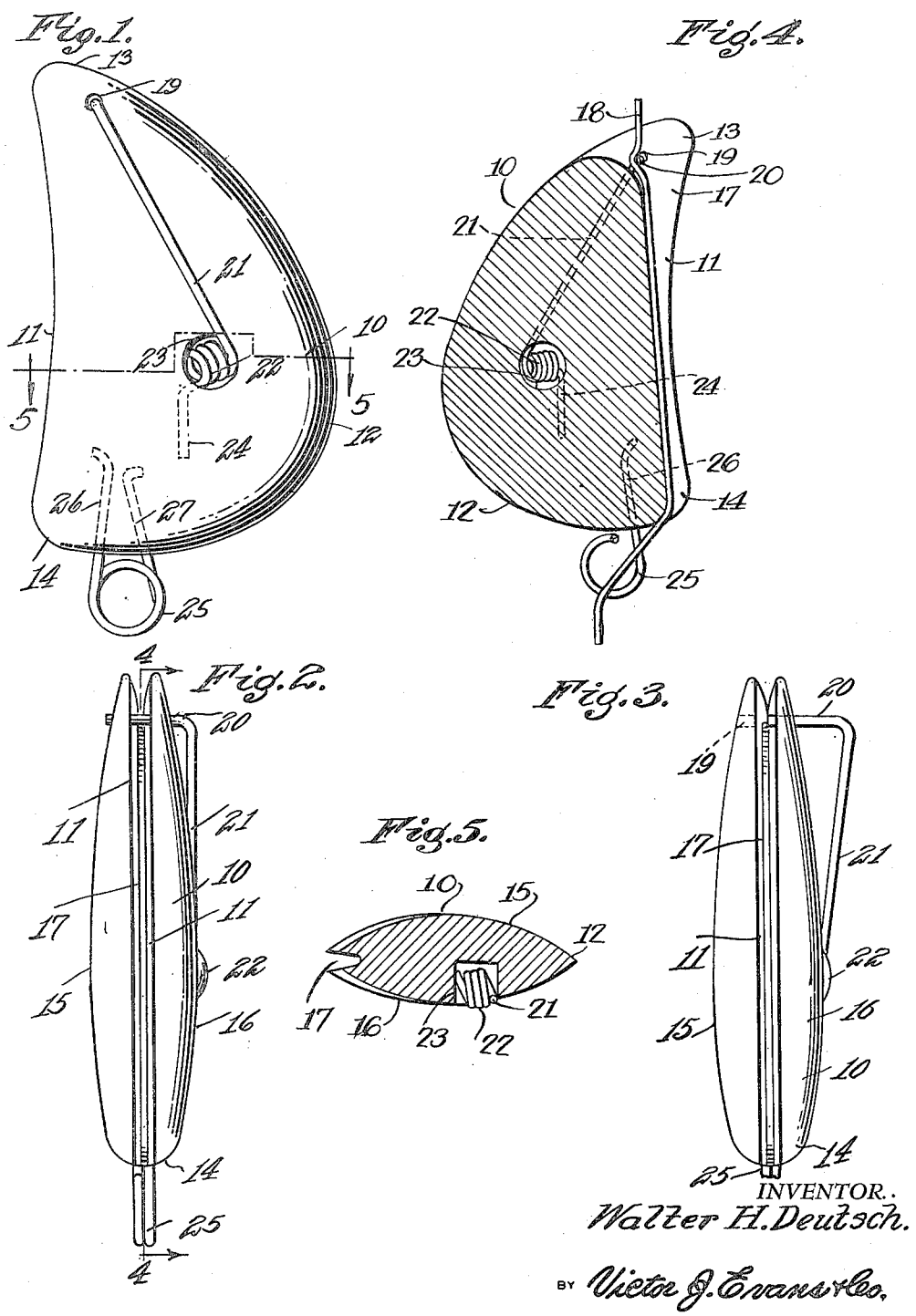

2,495,572

UNITED STATES PATENT OFFICE 2,495,572

JIFFY SLIP FISHING SINKER

Walter H. Deutsch, Seattle, Wash.

Application March 12, 1947, Serial No. 734,065

1 Claim. (Cl. 43—52)

This invention relates to a lead fishing sinker for sport fishing or any type of fishing where a fishing pole is used.

An object of the invention is to provide a sinker that can be put onto or taken off of a fishing line in a short space of time, in the daytime or night-time, without the use of illumination and without loosing tension on the fishing line.

Another object of the invention is to provide a sinker that will not tangle the line in a strong tide, and once fixed to the line, cannot be pulled off by accident or other unnatural causes.

The shape of the sinker will cause the sinker to cut through the water and eliminate drag from the pole usually caused by sinkers of conventional shape, and its shape also tends to prevent spinning of the sinker.

With the above and other objects and advantages in view, the invention consists of the novel details of construction, arrangement and combination of parts more fully hereinafter described, claimed and illustrated in the accompanying drawing in which:

Figure 1 is an elevational view of an embodiment of the invention;

Figure 2 is an edge view thereof with the pin in closed position;

Figure 3 is the same, with the pin in release position;

Figure 4 is a sectional view on a reduced scale on the line 4—4 of Figure 2 and

Figure 5 is a sectional view on a reduced scale on the line 5—5 of Figure 1.

Referring more in detail to the drawing, the reference numeral 10 designates the sinker embodying the invention. The body of the sinker may be compared in shape to an oyster shell, having a slightly concave front edge 11, and a convex curved rear edge 12 extending from the curved top 13 to the curved bottom 14, and the sides of the body of the sinker are convex as at 15 and 16, respectively.

A slot or split 17 extends from the top 13 downwardly through the edge 11 to the bottom 14, and it is in this slot that the fishing line 18 is placed, as shown in Figure 4.

Adjacent the top, the sides are provided with alined apertures 19, through which the end 20 of the spring arm 21, which is at right angles to the intermediate portion of the arm, passes to retain the line 18 in the split or slot 17, and the arm 21 is tensioned by the coils 22 positioned in the recess 23 in the side 16 of the sinker, and the end 24 of the coils is embedded in the sinker at the moulding thereof to retain the coils in the recess.

Spring coils 25 for receiving the line 18 are provided with ends 26 and 27 which are also embedded in the body for the retaining of the coils on the sinker.

The spring arm 21 is always in closed position with the end 20 extending through the apertures 19. To place the sinker on the line 18, the arm is pulled outwardly to release the end 20 from the apertures 19, the line is placed in the slot 17, the arm released and the sinker is attached to the line. The line 18 is placed between the coils 25 so that the sinker is the desired distance from the bait. For example, in salmon fishing, the sinker is placed on the line some twenty-five feet from the bait. When the salmon bites the line, the line is pulled from the coils 25, and the sinker slides down to the bait or near the fish, so that the fish, when pulled in, can be easily gaffed. If the sinker were permanently fixed to the line, the gaffing procedure would be difficult.

It is believed that from the foregoing description, the operation and construction of the invention will be apparent to those skilled in the art, and it is to be understood that changes in the minor details of construction may be resorted to, provided they fall within the spirit of the invention and the scope of the appended claim.

Having thus described the invention, what is claimed as new and desired to be secured by Letters Patent is:

A fishing sinker of the type described, having a slightly concave forward edge, a curved top and bottom, a convex rear edge, and convex sides, said forward edge being provided with a slot to receive a fishing line, said sides having alined apertures therethrough near the curved top, said sinker having a recess in one side thereof, a spring arm having a coiled portion adjacent one end thereof which is mounted in said recess in the side of the sinker, said spring arm having the other end thereof at right angles to the intermediate portion thereof to pass through said apertures to guide said line in said slot, and a series of coils mounted on the bottom of said sinker to receive the line below the sinker to hold said sinker fixed to said line, and adapted to release said line upon a downward pull thereon so that said sinker can slide on said line being retained thereon by said spring arm.

WALTER H. DEUTSCH.

REFERENCES CITED

The following references are of record in the file of this patent:

UNITED STATES PATENTS

| Number | Name | Date |
|---|---|---|
| 942,597 | Teasdale | Dec. 7, 1909 |
| 2,183,818 | Minser | Dec. 19, 1939 |
| 2,425,069 | Metzler | Aug. 5, 1947 |